United States Patent Office 3,231,662
Patented Jan. 25, 1966

3,231,662
METHOD AND APPARATUS FOR EFFECTING ELECTRICAL INSULATION UTILIZING HEXAFLUOROACETONE AS DIELECTRIC
Whitney H. Mears, Morris Plains, and Sabatino R. Orfeo, Hanover Township, N.J., assignors to Allied Chemical Corporation, New York, N.Y., a corporation of New York
No Drawing. Filed Oct. 1, 1963, Ser. No. 314,579
2 Claims. (Cl. 174—17)

This invention relates to the methods and apparatus for effecting electrical insulation.

A major objective of the invention is to provide a gaseous insulating medium which has high dielectric or electrical breakdown strength and also desiccating properties.

Hexafluoroacetone, $CF_3COCF_3$, is a known compound which is normally a colorless gas and has a boiling point of minus 27.5° C. at atmospheric pressure, a melting point of minus 122° C., and is a stable gas at temperatures up to about 400° C.

The invention is based principally on the discovery of the dielectric properties of $CF_3COCF_3$. In accordance with the invention, we have found that hexafluoroacetone has dielectric or electrical breakdown strength higher than that of gases in use for insulating purposes, e.g. sulfur hexafluoride, $SF_6$, a commercial gaseous insulating medium.

We find that hexafluoroacetone has electrical breakdown strength approximately 15–20% higher than that of sulfur hexafluoride under parallel conditions. Tests referred to herein were carried out in a "ball-to-plane" cell comprising a vertically disposed 2" I.D. Pyrex tube 6" high. The lower end of the tube was secured in gas-tight relation to a metallic base which included a ground terminal and a valve-controlled gas inlet opening into the bottom of the tube, to facilitate charging of gaseous dielectric. Projecting upwardly from the base and into the tube was a fixed electrode, electrically associated with the ground terminal, coaxially disposed with the tube, and capped by a horizontally disposed brass disc 1.5" in diameter. Fitted onto the top of the tube in gas-tight relation is a circular metallic cap including a high voltage terminal. Projecting downwardly from the center of the cap was a vertically moveable electrode coaxially disposed with the tube, and carrying on the lower end a 3⁄4" steel sphere. The upper electrode, electrically connected with the high voltage terminal, was provided with mechanical and micrometer facilities for raising and lowering the electrode to determine and fix the gap between the ball and the plane upper face of the disc, the combination of which afforded a substantially uniform field. The electrode terminals were electrically connected to a 50 kv. transformer and other known accessories to facilitate control of voltage and voltage rate rise across the gap, and observation of such values. The cell described is being considered for adoption by the ASTM as standard equipment for use in determining dielectric strength of gases.

In a first series of tests, gaseous hexafluoroacetone, after drying by passing same through silica gel, was charged into the cell to fill the same with $CF_3COCF_3$ at substantially atmospheric pressure, temperature of apparatus and gas during all runs was about room temperature. The gap between the ball and the plate was fixed at 0.10 inch. The equipment was adjusted to a rate rise potential of 0.5 kv. per second. In five test runs in this series, breakdown voltage in kilovolts was 17.8, 18.0, 18.3, 18.4 and 20.0, averaging about 18.5. In comparative runs under the same conditions using in one instance nitrogen as the insulating gas and in the other sulfur hexafluoride, respective breakdown voltages were 7.0 kv. and 16 kv. In a second series of five tests, all conditions being the same as in the first series except as noted below, breakdown voltages in kilovolts were 18.3, 19.3, 19.8, 20.7 and 19.3, averaging about 19.5.

In addition to discovery of the dielectric properties of hexafluoroacetone, we find that this compound simultaneously functions to desiccate the interior of the equipment in which the hexafluoroacetone is employed. It has been determined that gaseous hexafluoroacetone reacts rapidly with water to form hexafluoroacetone monohydrate, $CF_3COCF_3.H_2O$, a compound which is normally a solid having a melting point of about plus 46° C.

In the first of the above series of test runs, the incoming $CF_3COCF_3$ gas was dried prior to use but no precautions were taken to thoroughly dry the inside of the cell. In runs of this series, it was observed that there was formed on the inner wall of the cell significant incrustations of the solid, substantially white, crystalline, hexafluoroacetone monohydrate. Notwithstanding formation of the latter and the corresponding desiccation of the interior of the cell casing, there was no interference of dielectric properties of the $CF_3COCF_3$ gas in the cell. In the second series of runs, the cell was thoroughly dried before use, and no monohydrate formed in the cell. As known, moisture is always a major problem in electrical insulation. The invention affords not only the discovery of the high dielectric strength of $CF_3COCF_3$, but also provides a single, easily handleable gas which, while primarily a dielectric, secondarily functions as a moisture scavenger, i.e. the $CF_3COCF_3$ primarily insulates and simultaneously dries. The hexafluoroacetone monohydrate has an appreciable vapor pressure at room temperature, hence any undesirable accumulations of monohydrate can be removed from the equipment by pumping. Further, on heating at temperatures appreciable above the melting point, $CF_3COCF_3.H_2O$ may be disposed of as vaporous material.

Practice of the invention involves insulating any two or more spaced electrical elements subject to differences of electric potential by filling the space between such elements with gaseous dielectric. While $CF_3COCF_3$ may be used in conjunction with other dielectric gases or gaseous diluents, in practice the dielectric preferably consists of $CF_3COCF_3$. Pressures at which $CF_3COCF_3$ may be employed may vary from atmospheric or below up to that at which incipient liquefaction may take place under prevailing temperature conditions. For example, at temperature of about 43° C. $CF_3COCF_3$ begins to liquefy at about 145 p.s.i.g. Keeping in mind boiling point and liquefaction properties, the $CF_3COCF_3$ may be used as a dielectric in any of the many situations in which a gaseous dielectric is adaptable for utilization. Where it is desired to make full use of the desiccating properties, it is preferred to employ the $CF_3COCF_3$ under conditions in which temperature in the gas space is maintained above the boiling point of $CF_3COCF_3$ and below the melting point of $CF_3COCF_3.H_2O$. Method aspects of the invention are illustrated by the above described operation of the testing cell which includes two spaced elements subject to differences of electric potential and the filling of the space between these elements with $CF_3COCF_3$. The testing cell also exemplifies apparatus of the invention, i.e. a gas-tight casing, spaced apart electrical elements therein adapted to be subjected to difference of electric potential, and gaseous $CF_3COCF_3$ between the elements. Practice of the invention is not limited method of apparatus-wise by the particular procedure and apparatus above described. The principles of invention, from viewpoint of method, apply to any situation in which a gaseous dielectric may be used, and apparatus of the invention comprises other electrical equipment—such as switches, transformers, cables including coaxial cables and X-ray tube housings—to the extent that such equipment includes a gas tight casing, spaced electrical elements therein adapted to be subjected to differences of electric potential, and a gaseous insulator between such elements, preferably consisting of $CF_3COCF_3$.

We claim:

1. Apparatus comprising a gas-tight casing, spaced electrical elements therein adapted to be subjected to differences of electric potential, and a gaseous insulator between said elements comprising hexafluoroacetone.

2. Apparatus comprising a gas-tight casing, spaced electrical elements therein adapted to be subjected to differences of electric potential, and a gaseous insulator between said elements consisting essentially of hexafluoroacetone.

References Cited by the Examiner

UNITED STATES PATENTS 2,957,938  10/1960  Camilli et al. _____ 174—17

JOHN F. BURNS, *Primary Examiner.*

DARRELL L. CLAY, *Examiner.*